(12) United States Patent
Nishi et al.

(10) Patent No.: US 6,470,698 B2
(45) Date of Patent: Oct. 29, 2002

(54) FREEZER/REFRIGERATOR CAR

(75) Inventors: Kazuhiro Nishi; Minori Higuchi; Masato Doi; Etsuo Kamijo, all of Tokyo; Masanobu Tomomura; Hiroshi Ichikawa, both of Kanagawa, all of (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/012,453

(22) Filed: Dec. 12, 2001

(65) Prior Publication Data
US 2002/0078701 A1 Jun. 27, 2002

(30) Foreign Application Priority Data
Dec. 21, 2000 (JP) ........................................ 2000-389030

(51) Int. Cl.[7] ................................................. B60H 1/32
(52) U.S. Cl. ............................ 62/239; 62/426; 454/188
(58) Field of Search ........................... 62/239, 256, 426, 62/407; 454/188

(56) References Cited

U.S. PATENT DOCUMENTS 3,733,849 A * 5/1973 Cantagallo et al. ......... 454/105
4,800,733 A * 1/1989 Strobel et al. ................ 454/90
4,962,649 A * 10/1990 Battocletti .................. 454/188
5,187,945 A * 2/1993 Dixon .......................... 62/234
6,094,931 A * 8/2000 Jeong .......................... 454/193

* cited by examiner

Primary Examiner—William E. Tapolcai
(74) Attorney, Agent, or Firm—Antonelli, Terry, Stout & Kraus, LLP

(57) ABSTRACT

A freezer/refrigerator car equipped with a freezer/refrigerator having a carry-in/out opening formed at a rear end thereof for carrying the goods in and out, and a door mechanism for opening and closing the carry-in/out opening, wherein the door mechanism includes a first door pivotably mounted on the one side wall of the freezer/refrigerator, a second door pivotably mounted on the other side wall of the freezer/refrigerator, and a third door pivotably mounted on the other side of the second door, and an air curtain unit is disposed on the inside surface of the first door and blows out the air toward the other side wall across the carry-in/out opening in a state where the first door is closed.

1 Claim, 3 Drawing Sheets

FREEZER/REFRIGERATOR CAR

BACKGROUND OF THE INVENTION

1. Field of the Invention

The present invention is concerned with a freezer/refrigerator car for transporting foods in a frozen or refrigerated state.

2. Description of the Prior Art

In recent years, freezer/refrigerator cars have been widely used for transporting foods in a frozen or refrigerated state. The freezer/refrigerator cars of this type have been provided with a freezer/refrigerator having a carry-in/out opening at the rear end thereof for carrying goods in and out of the car, and a door for opening and closing the carry-in/out opening. In these freezer/refrigerator cars, when the door is opened for carrying goods in or out of the car, the cold air in the freezer/refrigerator flows out through the carry-in/out opening while the external air flows into the freezer/refrigerator. As a means for intercepting the flow in/out of the cold air and the external air, there has been employed an air curtain. The air curtain is generally of a system in which the air is blown downward from the upper side of the carry-in/out opening to form an air layer in the carry-in/out opening. According to the system in which the air is blown downward from the upper side of the carry-in/out opening, however, the cold air is blown out rearward along the ceiling surface from a cooling unit installed at a front upper end of the freezer/refrigerator and most of the cold air is utilized as an air curtain. Therefore, since it is difficult to prevent the cold air forming the air curtain further from flowing out of the freezer/refrigerator, there is a problem that the loss of the cold air is very large and the cooling effect is greatly lowered in the freezer/refrigerator.

In order to solve the above-mentioned problem of the air curtain system in which the air is blown out downward from the upper side of the carry-in/out opening, Japanese Laid-open Utility Model Publication (Kokai) No. 183639/1985 discloses a freezer car equipped with an air curtain system in which the air is blown out from the one side of the carry-in/out opening toward the other side to form a layer of air stream in the transverse direction across the opening of the carry-in/out opening. In this freezer car, an air curtain unit is disposed on one side of the carry-in/out opening of the freezer/refrigerator, and is constituted so as to blow the air out toward the other side from the air curtain unit across the carry-in/out opening.

In the freezer car disclosed in Japanese Laid-open Utility Model Publication (Kokai) No. 183639/1985, the air curtain unit is installed at a rear inner side of one side wall constituting the freezer/refrigerator. A door composed of a plurality of pieces of doors is arranged at the carry-in/out opening portion of the freezer/refrigerator. At the time of delivering goods, only some of the doors are opened to allow the goods to be carried in/out. At the time of loading the goods into the freezer/refrigerator, however, the doors are all opened to carry out the loading operation. In opening all of the doors and carrying out the loading operation as described above, the air curtain unit disposed at the rear inner side of one side wall of the freezer/refrigerator protrudes toward the carry-in/out opening to hinder the loading operation.

SUMMARY OF THE INVENTION

An object of the present invention is to provide a freezer/refrigerator car having an air curtain unit at a carry-in/out opening formed at a rear end of a freezer/refrigerator to blow the air out from the one side toward the other side, the air curtain unit being so disposed as will not to hinder the loading operation that is carried out upon leaving the doors open.

In order to accomplish the above-mentioned object according to the present invention, there is provided a freezer/refrigerator car equipped with a freezer/refrigerator that has a bottom wall, a ceiling wall, a front wall, both side walls and a carry-in/out opening formed at a rear end thereof for carrying the goods in and out, and is provided with a door mechanism for opening and closing the carry-in/out opening, wherein the door mechanism comprises a first door pivotably mounted on the one side wall of the freezer/refrigerator, a second door pivotably mounted on the other side wall of the freezer/refrigerator, and a third door pivotably mounted on the other side of the second door, and an air curtain unit is disposed on the inside surface of the first door and blows out the air toward the other side wall across the carry-in/out opening in a state where the first door is closed.

DETAILED DESCRIPTION OF THE PREFERRED EMBODIMENTS

A preferred embodiment of a freezer/refrigerator car constituted according to the present invention will now be described in further detail with reference to the accompanying drawings.

Figure 1:
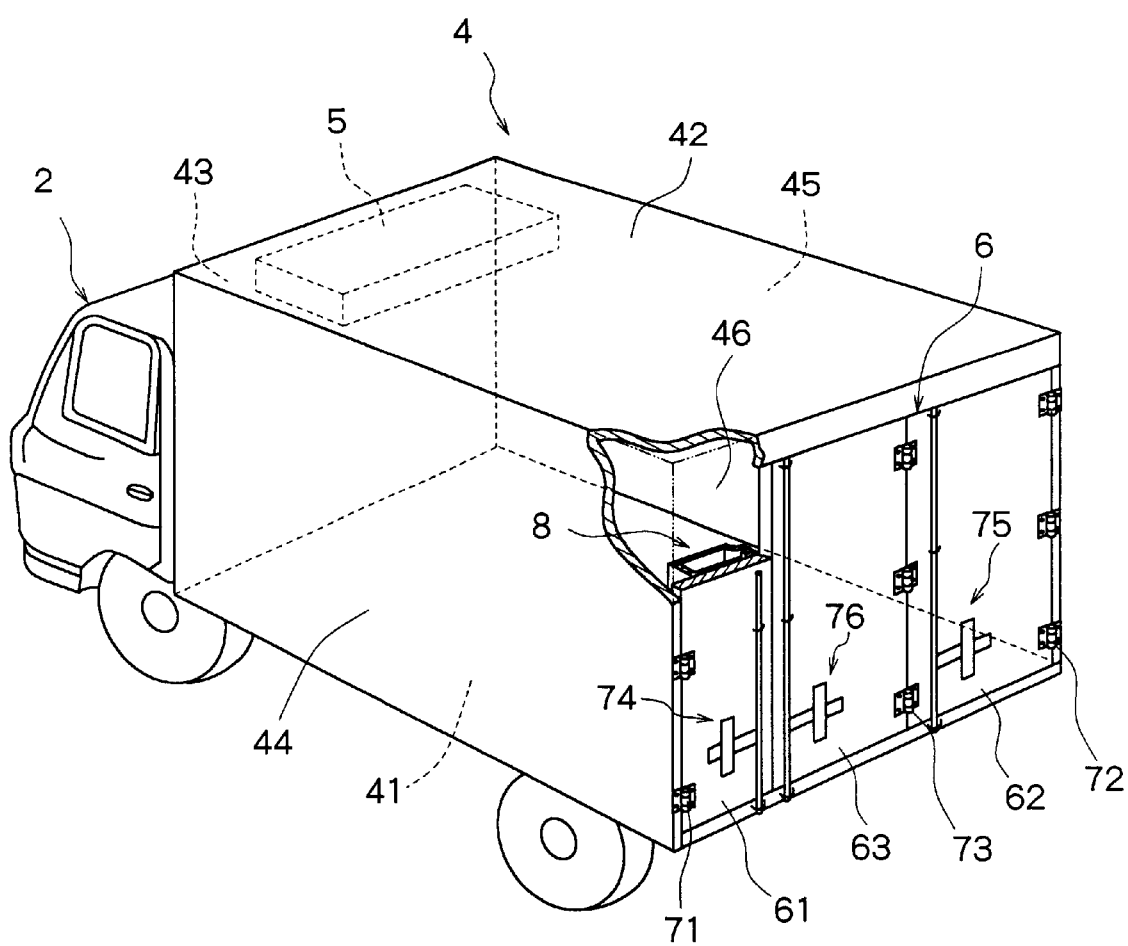
FIG. 1 is a perspective view illustrating, partly in a cut-away manner, a freezer/refrigerator car constituted according to the present invention.

FIG. 1 is a perspective view illustrating, partly in a cut-away manner, the freezer/refrigerator car constituted according to the present invention. The freezer/refrigerator car according to the illustrated embodiment has a driver's compartment 2 mounted on a chassis frame (not shown) and a freezer/refrigerator 4 mounted on the rear side of the driver's compartment 2. The freezer/refrigerator 4 includes a floor wall 41, a ceiling wall 42, a front wall 43 and side walls 44, 45. Heat-insulating materials are mounted on the inner surfaces of these walls. A cooling unit 5 in which a cooling device (evaporator) and a blower fan are built in, is disposed in a front part of the ceiling wall 42. At a rear end of the freezer/refrigerator 4, there are provided a carry-in/out opening 46 for delivering goods in and out, and also provided a door mechanism 6 for opening and closing the carry-in/out opening 46.

The door mechanism 6 comprises three pieces of doors, i.e., a first door 61, a second door 62 and a third door 63. In the illustrated embodiment, the second door 62 and the third door 63 have the same width, and the first door 61 has a width smaller than the width of the second door 62 and of the third door 63. The first door 61 is pivotably mounted on the one side wall 44 of the freezer/refrigerator 4 by hinge fittings 71. The second door 62 is pivotably mounted on the other side wall 45 of the freezer/refrigerator 4 by hinge fittings 72. The third door 63 is pivotably mounted at its one side on the other side of the second door 62 using hinge fittings 73. The first door 61, the second door 62 and the third door 63 are respectively provided with known locking mechanisms 74, 75 and 76 for limiting their operations in a closed state shown in FIG. 1. On the inside surface of the first door 61 constituting the above door mechanism 6, there is disposed an air curtain unit 8 for blowing out the air toward the other side wall 45 across the carry-in/out opening 46 in a state where the first door 61 is closed as shown in FIG. 1.

Figure 2:
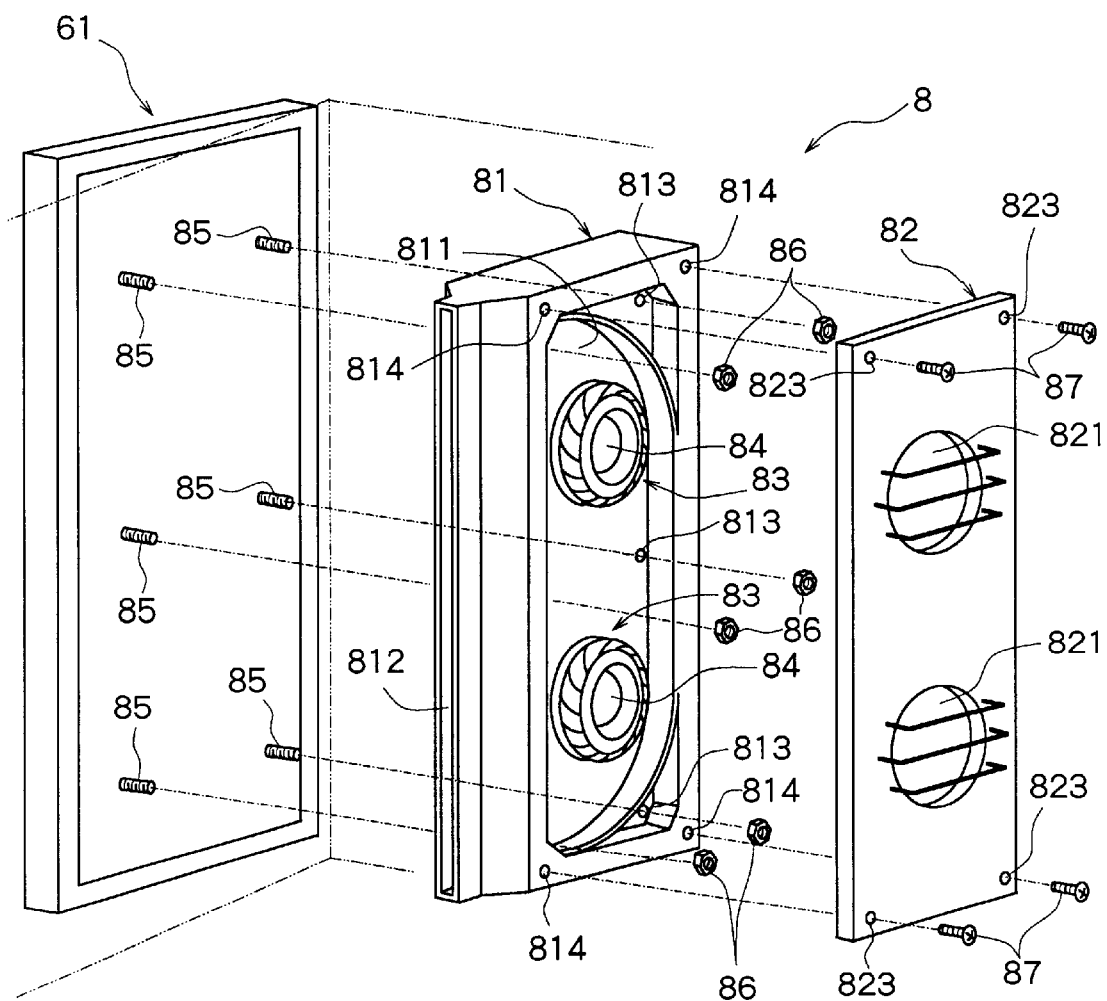
FIG. 2 is a perspective view illustrating, in a disassembled manner, an air curtain unit installed in the freezer/refrigerator car constituted according to the present invention.

The air curtain unit 8 will now be described with reference to FIG. 2.

The air curtain unit 8 in the illustrated embodiment comprises a unit housing 81 and a cover 82. The unit housing 81 has a height and a width slightly smaller than the height and the width of the first door 61, and is formed of a suitable synthetic resin. The unit housing 81 has a blower chamber 811 which is opened toward the inner side (opened toward the freezer/refrigerator side) and a blower port 812 which is communicated with the blower chamber 811 and is opened toward the other sidewall 45. Two sirocco fans 83 and 83 are disposed in the blower chamber 811 at a distance in the up-and-down direction. The sirocco fans 8:3 and 83 are rotated by respective electric motors 84 and 84 disposed in the unit housing 81. A cover 82 is formed of a suitable synthetic resin, and has suction ports 821 and 821 at positions corresponding to the above sirocco fans 83 and 83. The thus constituted unit housing 81 has, at both side portions thereof, three mounting holes 813, respectively. The first door 61 has six stud bolts 85 protruding from the inner surface thereof. The mounting holes 813 formed in the unit housing 81 are fitted to the stud bolts 85, and nuts 86 are screwed and fastened onto the stud bolts 85 to mount the unit housing 81 on the inner surface of the first door 61. Further, mounting holes 823 are formed at four corners of the cover 82. Screws 87 are inserted in the mounting holes 823 and are screwed into threaded holes 814 provided at four corners of the unit housing 81, thereby to mount the cover 82 on the unit housing 81.

Figure 3:
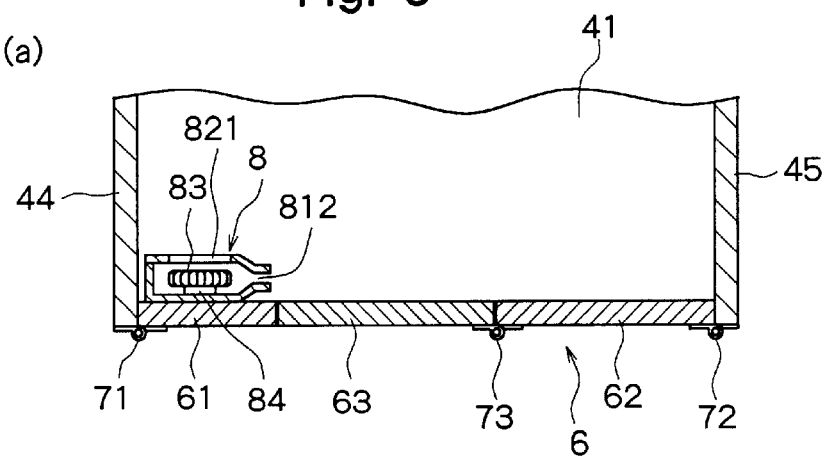
FIG. 3 is a diagram illustrating the states of operation of the door mechanism installed in the freezer/refrigerator car constituted according to the present invention.
Figure 3:
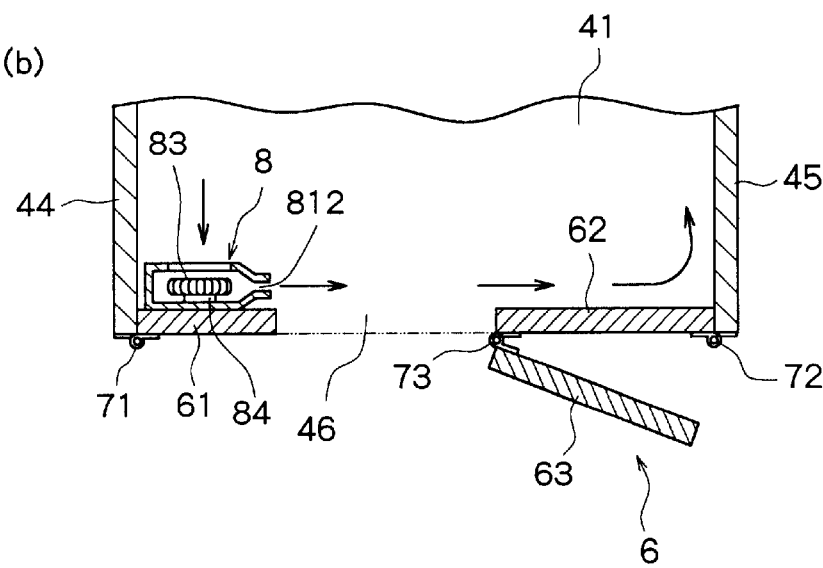
Figure 3:
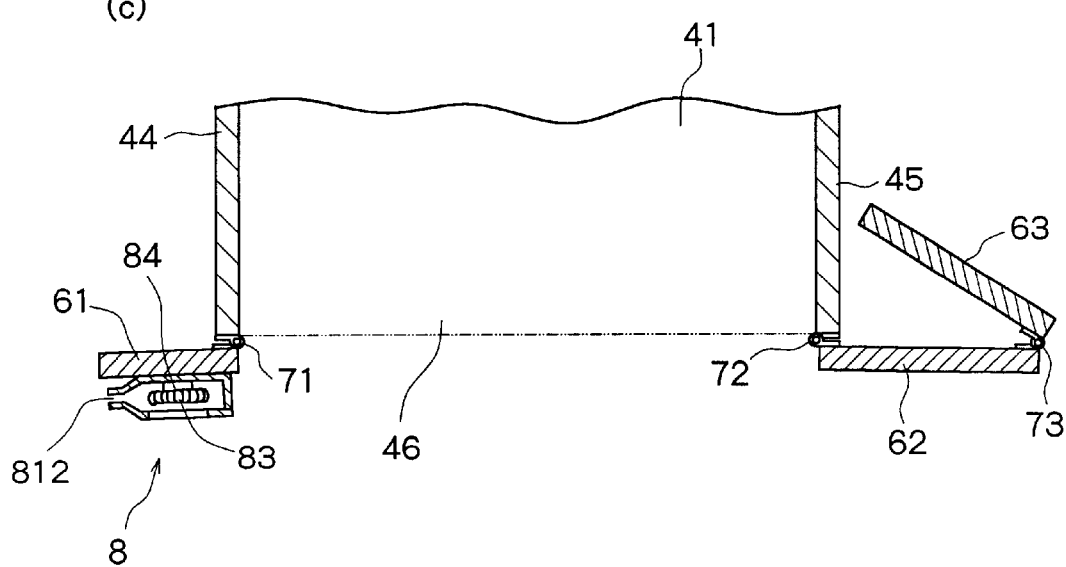

The freezer/refrigerator according to the illustrated embodiment is constituted as described above. Described below with reference to FIG. 3 are the door mechanism 6 that is opened and closed, and the stream of the air blown out from the air curtain unit 8.

FIG. 3(a) illustrates a state where the door mechanism 6 is closed during the freezer/refrigerator car being traveling. In this case, the air curtain unit 8 is not in operation.

FIG. 3(b) illustrates a state where the freezer/refrigerator car has arrived at a store which is a destination of delivery and the third door 63 is opened for carrying the goods out. Here, in the illustrated embodiment, the second door 62 and the third door 63 have the same width. Therefore, the third door 63 that is opened does not protrude to the outer side beyond the side surface of the freezer/refrigerator 4. When the third door 63 is opened as described above, a door switch that is not shown detects the opening of the door. In response to a detection signal, the electric motors 84 and 84 are energized to drive the sirocco fans 83 and 83 in the air curtain unit 8. As the sirocco fans 83 and 83 are rotated, the air curtain unit 8 sucks the cold air in the freezer/refrigerator through the suction ports 821 and 821, blows the air out toward the other side wall 45 of the freezer/refrigerator 4 from the blower port 812 thereby to form a layer of air stream across the carry-in/out opening 46 that is opened. The air blown out from the blower port 812 passes, as indicated by an arrow, across the carry-in/out opening 46 that is opened, flows along the inner surface of the second door 62, and hits the other side wall 45 so as to be headed toward the front portion in the freezer/refrigerator. At the time of opening the third door 63 and carrying out the goods as described above, the air is blown from the blower port 812 of the air curtain unit 8 toward the other side wall 45, passes across the carry-in/out opening 46 that is opened, and flows along the inner surface of the second door 62 and along the inner surface of the side wall 45 toward the front in the freezer/refrigerator, minimizing the flow out of the air to the outside of the freezer/refrigerator.

FIG. 3(c) illustrates a state where the first door 61, the second door 62 and the third door 63 are all opened for loading the goods into the freezer/refrigerator 4. When the three pieces of doors are all opened as described above, the carry-in/out opening 46 is fully opened. In the illustrated embodiment, in this case, since the air curtain unit 8 which is mounted on the inside surface of the first door 61, it does not exist in the carry-in/out opening 46. In opening all of the three pieces of doors and loading the goods into the freezer/refrigerator 4, therefore, the loading operation is not hindered by the air curtain unit 8.

The freezer/refrigerator car according to the present invention is constituted as described above, and exhibits actions and advantages as described below.

That is, according to the present invention, the door mechanism is constituted by three pieces of doors for opening and closing the carry-in/out opening that is formed at the rear end of the freezer/refrigerator, and an air curtain unit is disposed on the inside surface of the first door that is pivotably mounted on one side wall of the freezer/refrigerator, in order to blow out the air toward the other side wall across the carry-in/out opening in a state where the first door is closed. At the time of opening all of the doors and loading the goods into the freezer/refrigerator, therefore, the loading operation is not hindered by the air curtain unit.

What we claim is:

1. A freezer/refrigerator car equipped with a freezer/refrigerator that has a bottom wall, a ceiling wall, a front wall, both side walls, a carry-in/out opening formed at a rear end thereof for carrying the goods in and out, and is provided with a door mechanism for opening and closing the carry-in/out opening, wherein said door mechanism includes a first door pivotably mounted on the one side wall of the freezer/refrigerator, a second door pivotably mounted on the other side wall of the freezer/refrigerator, and a third door pivotably mounted on the other side of said second door, and an air curtain unit is disposed on the inside surface of said first door and blows out the air toward said other side wall across said carry-in/out opening in a state where said first door is closed.

* * * * *